United States Patent
Bartel et al.

(10) Patent No.: US 11,628,559 B2
(45) Date of Patent: Apr. 18, 2023

(54) INDUSTRIAL ROBOT FOR MATERIAL PROCESSING

(71) Applicant: TRUMPF Werkzeugmaschinen GmbH + Co. KG, Ditzingen (DE)

(72) Inventors: Wolfgang Bartel, Rutesheim (DE); Maximilian Merk, Benningen (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 1017 days.

(21) Appl. No.: 16/268,740

(22) Filed: Feb. 6, 2019

(65) Prior Publication Data
US 2019/0168379 A1    Jun. 6, 2019

Related U.S. Application Data

(63) Continuation of application No. PCT/EP2017/069845, filed on Aug. 4, 2017.

(30) Foreign Application Priority Data

Aug. 10, 2016   (DE) .......................... 102016214874.5

(51) Int. Cl.
*B25J 9/04*        (2006.01)
*B25J 19/00*       (2006.01)
(Continued)

(52) U.S. Cl.
CPC .............. *B25J 9/046* (2013.01); *B23K 26/21* (2015.10); *B25J 11/005* (2013.01); *B25J 19/0025* (2013.01)

(58) Field of Classification Search
CPC .... B25J 15/0066; B25J 19/0025; B25J 9/046; B23K 26/21
See application file for complete search history.

(56) References Cited

U.S. PATENT DOCUMENTS 7,278,253 B2 * 10/2007 Wehler .................. H02G 11/00
                                                       248/51
9,975,239 B2 *  5/2018 Kinoshita ................. B25J 9/12
(Continued)

FOREIGN PATENT DOCUMENTS

CN      1714981 A      1/2006
CN     103802135       5/2014
(Continued)

OTHER PUBLICATIONS

International Search Report and Written Opinion in International Application No. PCT/EP2017/069845, dated Dec. 8, 2017, 23 pages (with English translation).
(Continued)

*Primary Examiner* — Randell J Krug
(74) *Attorney, Agent, or Firm* — Fish & Richardson P.C.

(57) ABSTRACT

An industrial robot for material processing includes a manipulator with a base, a link, an arm and a hand. A processing device of the industrial robot is movable by the manipulator and is attached to the hand of the manipulator, and is supplied with a medium via a medium line. Provided for the medium line is a drag chain subjected to a traction directed away from a connection of the drag chain close to a processing location by a tensioning device. The tensioning device has a tensioning lever and a restoring device. The tensioning lever is attached to a partial length of the drag chain. The tensioning lever is deflectable, counter to an action of a restoring force generated by the restoring device, towards the connection of the drag chain close to the processing location such that the tensioning lever performs a pivoting movement about a lever pivot axis.

18 Claims, 2 Drawing Sheets

(51) Int. Cl.
*B23K 26/21* (2014.01)
*B25J 11/00* (2006.01)

(56) References Cited

U.S. PATENT DOCUMENTS

| | | | | |
|---|---|---|---|---|
| 9,986,958 | B2* | 6/2018 | Atzinger | ............... B25J 19/0025 |
| 2008/0035619 | A1* | 2/2008 | Hamaguchi | ............ B25J 9/1664 |
| | | | | 219/121.79 |

FOREIGN PATENT DOCUMENTS

| | | |
|---|---|---|
| CN | 105078578 A | 11/2015 |
| DE | 92 17 659 | 4/1994 |
| DE | 201 12 491 | 10/2001 |
| DE | 201 13 742 | 11/2001 |
| DE | 201 13 950 | 11/2001 |
| DE | 101 58 741 | 6/2003 |
| DE | 10216081 A1 | 10/2003 |
| DE | 20 2006 006 637 | 7/2006 |
| DE | 102007008985 | 8/2008 |
| DE | 102007008985 A1 * | 8/2008 ......... B25J 19/0025 |
| DE | 10 2011 018 440 | 12/2011 |
| DE | 20 2015 002 063 | 5/2015 |
| DE | 10 2014 102 955 | 6/2015 |
| DE | 10 2014 209684 | 11/2015 |
| JP | 2013166223 A | 8/2013 |
| SE | 1100683 A1 | 9/2011 |
| WO | WO 2010/043214 | 4/2010 |

OTHER PUBLICATIONS

CN Office Action in Chinese Appln. No. 201780055624.5, dated Jul. 6, 2021, 15 pages (with English translation).
Trumpf, "TruLaser Robot 5020," Laser systems: Up to the challenge, Jul. 9, 2015, 44 pages (refer to pp. 18-23).
Trumpf, "Laser Welding for Sheet Metal Production," Press Release, Jul. 9, 2015, 6 pages (with English translation).

* cited by examiner

INDUSTRIAL ROBOT FOR MATERIAL PROCESSING

CROSS REFERENCE TO RELATED APPLICATIONS

This application is a continuation of and claims priority under 35 U.S.C. § 120 from PCT Application No. PCT/EP2017/069845 filed on Aug. 4, 2017, which claims priority from German Application No. DE 10 2016 214 874.5, filed on Aug. 10, 2016. The entire contents of each of these priority applications are incorporated herein by reference.

TECHNICAL FIELD

The invention relates to an industrial robot for material processing.

BACKGROUND

In the case of industrial robots of the type described above, for example in the case of an industrial robot as is marketed by the company TRUMPF (address: Johann-Maus-Straße 2, 71254 Ditzingen, Germany) under the designation "TruLaser Robot 5020," various media are intended to be fed to the processing apparatus attached to the hand of the manipulator by means of corresponding media lines. For example, the processing apparatus is to be supplied with the energy for drive motors or with media that are used directly for the material processing. In order to provide protection against external influences, for example in order to provide protection against mechanical stress associated with the multiaxial movements of the processing apparatus, the media lines are guided by means of a drag chain on the route thereof to the processing apparatus. The drag chain extends along the modules of the manipulator and comprises a connection close to the processing location, arranged on the processing apparatus, and a stationary connection remote from the processing location that is arranged away from the processing apparatus. The multiaxial movements carried out by the manipulator or by the processing apparatus during operation are also carried out by the drag chain. Owing to corresponding movements of the manipulator and/or of the processing apparatus, the drag chain connected to said processing apparatus is moved in particular in the longitudinal direction of the chain. In this instance, the drag chain has to be guided on the manipulator such that operation-related damage to the drag chain and the media lines guided thereby is impossible, irrespective of the multiple and often very fast movements of the processing apparatus and the modules of the manipulator provided with the processing apparatus.

SUMMARY

The object of the present invention is that of providing an industrial robot which takes account of this requirement in particular.

The invention relates to an industrial robot for material processing comprising a manipulator that has a base, a link, an arm and a hand, the link being mounted on the base so as to be pivotable about a link axis, the arm being mounted on the link so as to be spaced apart from the link axis and so as to be pivotable about an arm axis that extends in parallel with the link axis, and the hand being movable at least uniaxially relative to the arm.

The industrial robot further comprises a processing apparatus that can be moved by means of the manipulator, is attached to the hand of the manipulator and can be supplied with a medium by means of at least one media line.

The industrial robot further comprises a drag chain for the media line, the drag chain comprising a connection close to the processing location, on the processing apparatus, and a connection remote from the processing location that is spaced apart from the processing apparatus, and the connection of the drag chain that is close to the processing location being movable relative to the connection remote from the processing location, owing to movements of the manipulator and/or of the processing apparatus, and the drag chain being retained on the manipulator, between the connection close to the processing location and the connection remote from the processing location, by a plurality of retaining means, one retaining means of which is provided for the drag chain, as a link-side retaining means, on the link of the manipulator.

According to the invention, the drag chain is tensioned by a tensioning means which engages for this purpose on a partial length of the drag chain which in turn extends between the link-side retaining means for the drag chain and the connection of the drag chain close to the processing location. Proceeding from the link-side retaining means, the drag chain may not initially be guided along the link to the arm axis and therefrom to the connection of the drag chain close to the processing location, but instead may extend from the link-side retaining means directly to the connection close to the processing location, in particular so as to form a chain arc, without further retaining means for the drag chain being provided between said two retaining means. A tensioning lever, which engages on the mentioned partial length of the drag chain and is also pivotable on the manipulator about a pivot axis that extends in parallel with the pivot axis of the link, subjects the drag chain to traction that is oriented away from the connection of the drag chain close to the processing location. If, owing to corresponding movements of the manipulator and/or of the processing apparatus in the direction counter to the traction generated by the tensioning lever, the drag chain performs a movement in the longitudinal direction of the chain, the tensioning lever of the tensioning means is thus deflected towards the connection of the drag chain close to the processing location, counter to the action of a restoring force generated by a restoring means or member of the tensioning means, such that the tensioning lever carries out a pivot movement about the lever pivot axis. In this manner, the tensioning means of the industrial robot according to the invention ensures that the drag chain is always tensioned so as to be taut, irrespective of the movements carried out by the manipulator and/or by the processing apparatus on the hand of the manipulator. As a result, uncontrolled movements, in particular what are known as lashing movements, of the drag chain are prevented, which movements could result in damage to the drag chain.

In particular, in some embodiments, uncontrolled movements of the drag chain are prevented if an arm-side retaining means for the drag chain is provided on the arm of the manipulator, between the link-side retaining means and the connection of the drag chain close to the processing location, and the tensioning lever of the tensioning means is attached to the partial length of the drag chain extending between the link-side retaining means and the arm-side retaining means.

In some embodiments, the drag chain is retained on the arm-side retaining means, provided between the tensioning means according to the invention and the connection of the drag chain close to the processing location, so as to be movable in the longitudinal direction of the chain. As a result, the tensioning means according to the invention can also exert traction on the partial length of the drag chain that adjoins the partial length loaded by the tensioning lever of the tensioning means according to the invention, on the sides of the arm-side retaining means positioned towards the processing apparatus.

For the purpose of structurally simple and low-wear guidance of the drag chain, in a further embodiment of the invention the link-side retaining means forms a chain pivot axis for the partial length of the drag chain that extends between the link-side retaining means and the connection close to the processing location, optionally the arm-side retaining means, which pivot axis is coaxial with the lever pivot axis of the tensioning lever of the tensioning means. Accordingly, in the event of movements of the manipulator and/or of the processing apparatus of the industrial robot, and in the case of resultant movements of the drag chain in the longitudinal direction of the chain, the partial length of the drag chain loaded by the tensioning means, and the tensioning lever of the tensioning means that is connected to said partial length of the drag chain, perform pivot movements about a common pivot axis. A relative movement of the drag chain and of the tensioning lever in the longitudinal direction of the chain, caused by the synchronous pivot movements of the partial length of the drag chain and of the tensioning lever, can be avoided. A rigid connection can be established between the tensioning lever of the tensioning means and the partial length of the drag chain.

In a further preferred embodiment of the invention, a defined pivot axis of the partial length of the drag chain that extends between the link-side retaining means and the connection close to the processing location, optionally the arm-side retaining means, is established by means of the link-side retaining means, in that the drag chain is retained by the link-side retaining means forming the chain pivot axis so as to be immovable in the longitudinal direction of the chain.

In order to prevent wear-inducing movements of the drag chain in the longitudinal direction of the chain, in some embodiments of the invention the link-side retaining means forms a chain pivot axis for the partial length of the drag chain that extends between the link-side retaining means and the connection close to the processing location, optionally the arm-side retaining means, which pivot axis is coaxial with the link axis.

Various designs are conceivable for the restoring means of the tensioning means according to the invention.

In some embodiments, a restoring means comprising a tension spring is provided, which spring is arranged between the tensioning lever of the tensioning means and the link of the manipulator, and which can be tensioned, by means of the partial length of the drag chain that extends between the link-side retaining means and the connection close to the processing location, optionally the arm-side retaining means, and that moves in the direction counter to the traction in the longitudinal direction of the chain, while generating the restoring force that acts on the tensioning lever.

It is preferred according to embodiments of the invention that the tension spring of the restoring means is designed as a pneumatic tension spring. In a cylinder of a piston-cylinder unit, a cylinder chamber filled with a gaseous medium is provided on one side of a piston that is guided in the cylinder. When the tensioning lever of the tensioning means performs a pivot movement towards the connection of the drag chain close to the processing location as a result of a movement of the partial length of the drag chain loaded by the tensioning means, the gaseous medium present in said cylinder chamber is resiliently compressed. As a result, the restoring force acting on the tensioning lever in the direction counter to the pivot movement thereof is generated.

In order to prevent uncontrolled restoring movements of the tensioning lever, according to a further preferred embodiment of the invention a preferably pneumatic damper is provided for the tension spring of the restoring means.

In order that a traction exerted on the drag chain by the tensioning means can be adapted to the requirements of the particular application, according to a development of the invention the magnitude of the restoring force acting on the tensioning lever of the tensioning means is adjustable.

In some embodiments, the tensioning lever of the tensioning means is also used for guiding the drag chain. For this purpose, the tensioning lever of the tensioning means comprises a retaining arm having a tensioning lever-side retaining means by means of which the drag chain is retained.

In particular in order to match the drag chain to the media lines to be guided by the drag chain, according to a further preferred embodiment of the invention the drag chain forms a radius of curvature of a limited magnitude. Limiting the radius of curvature of the drag chain also limits the radius of curvature of the media lines guided by the drag chain. Too steep a curvature, which could lead to damage to the media lines, is thus excluded.

A minimum radius of curvature of the drag chain should be met in particular when the drag chain guides an optical fiber cable as the media line, via which a laser beam reaches the processing apparatus on the hand of the manipulator, which apparatus is configured as a laser processing apparatus.

DESCRIPTION OF DRAWINGS

The invention will be explained in greater detail in the following, with reference to schematic drawings provided by way of example. In the drawings.

DETAILED DESCRIPTION

Figure 1:
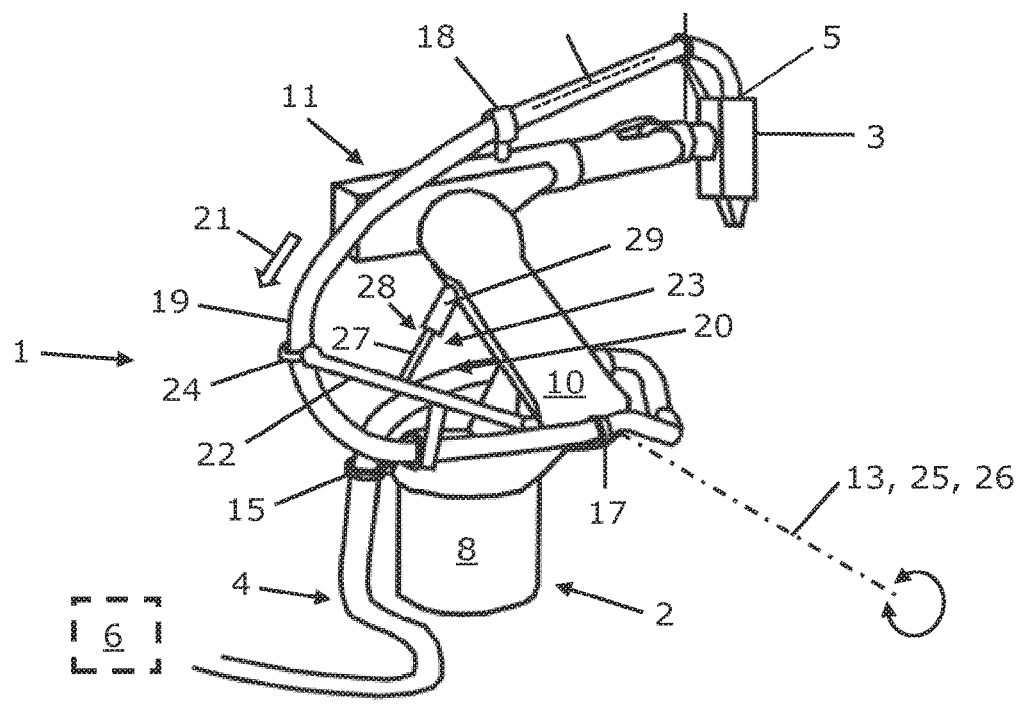
FIG. 1 shows an industrial robot for material processing, which robot is designed as a welding robot.
Figure 2:
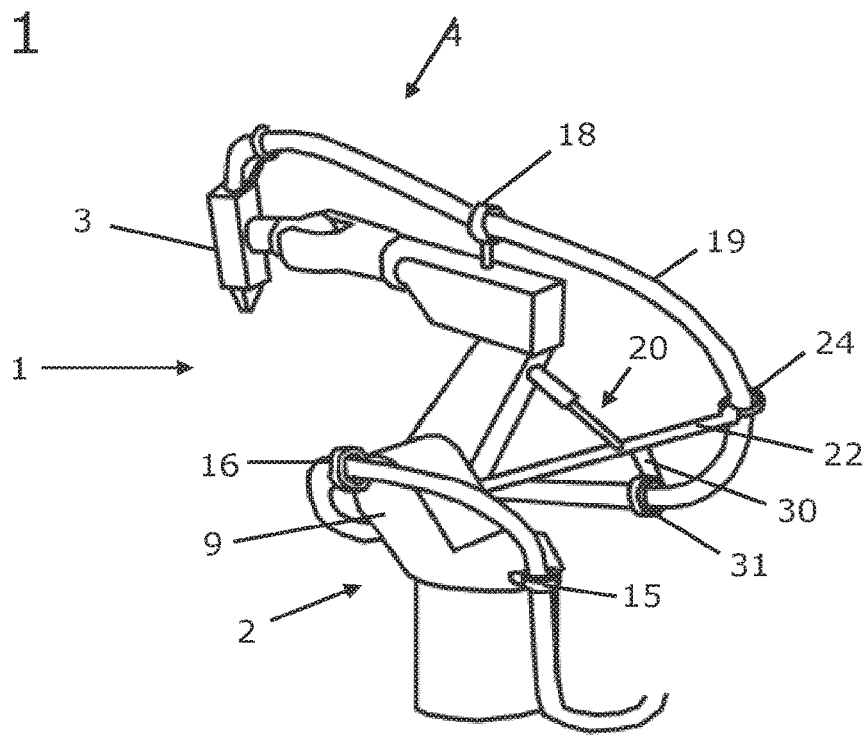
FIG. 2 is a view of the welding robot according to FIG. 1, towards the rear face of the welding robot that is remote from the viewer of FIG. 1.
Figure 3:
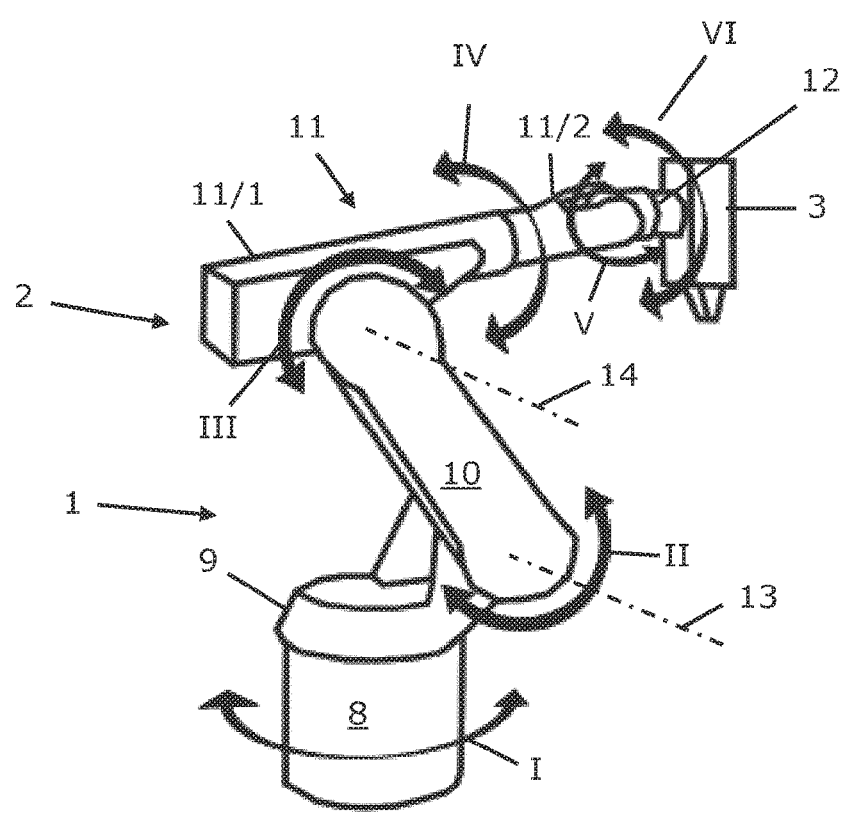
FIG. 3 shows the manipulator and the processing apparatus of the welding robot according to FIGS. 1 and 2, including the movement axes thereof.

According to FIGS. 1 to 3, an industrial robot for material processing, designed as a welding robot 1, comprises a manipulator 2 and a processing apparatus in the form of a laser welding head 3. A drag chain 4 of the welding robot 1 extends along the manipulator 2.

A longitudinal end of the drag chain 4 is connected to the welding head 3 by means of a connection 5 close to the processing location. A connection 6 of the drag chain 4 remote from the processing location that is outside the region of the drawings according to FIGS. 1 and 2 and is indicated in FIG. 1, is provided on the opposing longitudinal end of the drag chain 4. The location of the connection 6 of the drag chain 4 remote from the processing location does not change.

The drag chain 4 is of a conventional design and guides a plurality of media lines (hidden in FIGS. 1 and 2) in the inside thereof in a conventional manner. One of said media lines is an optical fiber cable 7 (indicated by dashed lines in FIG. 1), via which a laser beam generated by a beam source (not shown in the drawings) is fed to the welding head 3. Processing optics of a conventional design, accommodated in a housing of the welding head 3, directs the laser beam, generated by the beam source, to a processing location, in the form of a laser welding beam.

The optical fiber cable 7 is flexible. For the purpose of careful guidance of the optical fiber cable 7, the drag chain 4 is designed, in a known manner, such that the radius of curvature of the drag chain 4, and thus also the radius of curvature of the optical fiber cable 7 that follows the course of the drag chain 4, cannot become smaller than a minimum radius of curvature.

The manipulator 2 of the welding robot 1 comprises a stationary base 8, a carousel 9, a link 10, an arm 11, and a hand 12. According to FIG. 3, the carousel 9, together with the remaining modules of the manipulator 2, is mounted on the base 8 so as to be rotatable about a vertical axis in the direction of a double arrow I. Inter alia the link 10 is mounted on the base 8 via the carousel 9. The carousel 9 supports the link 10 so as to be pivotable about a horizontal link axis 13 (double arrow II). The arm 11 is mounted so as to be pivotable relative to the link 10, in the direction of a double arrow III, about an arm axis 14 which is likewise horizontal. A link-side portion 11/1 of the arm 11 mounts a hand-side portion 11/2 of the arm 11 that is rotatable in the direction of a double arrow IV. The hand 12 is mounted on the end of the hand-side portion 11/2 of the arm 11 remote from the link 10 so as to be pivotable in the direction of a double arrow V and rotatable in the direction of a double arrow VI. Accordingly, the manipulator 2 has a total of six movement axes.

The drag chain 4 is attached to the manipulator 2 of the welding robot 1 by means of a plurality of retaining means or retainers. Some of the retaining means retain the drag chain 4 so as to be immovable in the longitudinal direction of the chain, other ones of the retaining means are formed as a slide grommet, and thus allow for a movement of the drag chain 4 in the longitudinal direction of the chain.

A first carousel-side retainer or retaining means 15 and a second carousel-side retaining means 16 for the drag chain 4 are provided on the carousel 9 of the manipulator 2. The two carousel-side retaining means 15, 16 fix the drag chain 4 so as to be immovable in the longitudinal direction of the chain. The second carousel-side retaining means 16 is followed, towards the welding head 3, by a link-side retaining means 17 and an arm-side retaining means 18. The link-side retaining means 17 fastens the drag chain 4 to the manipulator 2 so as to be immovable in the longitudinal direction of the chain. The arm-side retaining means 18 is formed as a slide grommet and thus allows for movements of the drag chain 4 in the longitudinal direction of the chain. The link axis 13 extends through the link-side retaining means.

A tensioning element 20 of the welding robot 1 engages on a partial length of the drag chain 4 which partial length is formed by a chain arc 19 and is arranged between the link-side retaining means 17 and the connection 5 close to the processing location, in the example shown between the link-side retaining means 17 and the arm-side retaining means 18.

The tensioning element 20 subjects the drag chain 4 to a traction that is oriented away from the processing-side connection 5 and is indicated in FIG. 1 by an arrow 21. The tractive force exerted on the drag chain 4 is generated by a tensioning lever 22 and a restoring member 23 of the tensioning element 20.

The tensioning lever 22 comprises a fixed connection 24 at a longitudinal end thereof, by means of which connection said tensioning lever 22 is fastened to the chain arc 19 such that a relative movement of the drag chain 4 and the tensioning lever 22 in the longitudinal direction of the chain is impossible. At the opposing longitudinal end thereof, the tensioning lever 22 is mounted so as to be pivotable about a lever pivot axis 25. The directions of the possible pivot movements of the tensioning lever 22 about the lever pivot axis 25 are indicated in FIG. 1 by a double arrow. The lever pivot axis 25 coincides with the link axis 13 and furthermore with a chain pivot axis 26, which is in turn provided by the link-side retaining means 17.

The restoring member 23, specifically a piston rod 27 of a pre-tensioned pneumatic tension spring 28 of the restoring member 23, engages on the tensioning lever 22 between the fixed connection 24 on the drag chain 4 and the lever pivot axis 25. In addition to the piston rod 27, the pneumatic tension spring 28 comprises a cylinder 29. Inside the cylinder 29, a piston that is attached to the piston rod 27 and is hidden in FIGS. 1 and 2, is displaceable along the cylinder axis. A cylinder chamber is formed in each case on either side of the piston, in the direction of the cylinder axis, the cylinder chamber that is shown uppermost towards the link 10 in the drawings being connected to a compressed air supply of the welding robot 1 and consequently, in FIG. 1, containing compressed air at a defined pressure. The lower cylinder chamber of the pneumatic tension spring 28, which chamber is located towards the tensioning arm 22 in the drawings, is provided with an inlet/outlet valve and is thereby connected to the free atmosphere. The tensioning lever-side end of the piston rod 27 is pivotably hinged to the tensioning lever 22, and the link-side end of the cylinder 29 is pivotably mounted on the link 10.

A retaining arm 30 is attached to the tensioning lever 22, between the articulation point of the piston rod 27 of the pneumatic tension spring 28, and the lever pivot axis 25, which retaining arm 30 protrudes towards the drag chain 4 and guides the drag chain 4 on a tensioning lever-side retaining means 31 so as to be longitudinally movable.

During operation of the welding robot 1, movements of the modules of the manipulator 2, and thus also of the welding head 3, about all movement axes of the welding robot 1 are conceivable. Movements of the partial length of the drag chain 4 which partial length extends between the first carousel-side retaining means 15 and the connection 6 remote from the processing location are associated with movements of the carousel 9 in the direction of the double arrow I. In order for movements of this kind to be possible, the partial length of the drag chain 4 provided between the first carousel-side retaining means 15 and the connection 6 remote from the processing location comprises a sufficient reserve of chain, which reserve can be accommodated for example in a base channel, provided therefor, on the installation surface of the welding robot 1. The reserve of chain may be provided in the form of a loop for example, and/or can be fed, during rotational movements of the carousel 9, by means of an articulated arm (not shown in the drawings) that is provided on the base 8.

Common movements of the link 10, the arm 11, the hand 12 and the welding head 3 exclusively about the link axis 13 bring about pivot movements of the chain arc 19 about the chain pivot axis 26. Owing to the congruence of the link axis 13, the chain pivot axis 26 formed by the link-side retaining means 17, and the lever pivot axis 25 of the tensioning lever 22, said movement of the chain arc 19 is carried out as a pivot movement without relative movements between the drag chain 4 on the one hand, and the tensioning lever-side retaining means 31, the connection 24 of the tensioning lever 22 and the arm-side retaining means 18 on the other hand, in the longitudinal direction of the chain.

Movements of the drag chain 4 in the longitudinal direction of the chain occur in particular in the event of corresponding movements of the welding head 3 relative to modules of the manipulator 2. For example, if the hand 12 of the manipulator 2 that is provided with the welding head 3 pivots in the clockwise direction of the double arrow VI, proceeding from the situation according to FIG. 1, the portion of the drag chain 4 arranged between the link-side retaining means 17 and the connection 5 close to the processing location thus moves counter to the traction direction 21, in the longitudinal direction of the chain. A common pivot movement of the chain arc 19 and of the tensioning lever 22, rigidly mounted thereon, about the chain pivot axis 26 and about the lever pivot axis 25 coaxial with the chain pivot axis 26 is associated therewith.

The pivot movement of the tensioning lever 22 is associated with compression of the pneumatic tension spring 28. The piston rod 27 moves into the cylinder 29 of the pneumatic tension spring 28. The piston that is attached to the piston rod 27 and moves inside the cylinder 29, towards the link 10, resiliently compresses the compressed air in the upper cylinder chamber of the cylinder 29. As a result, a restoring force is exerted counter to the insertion movement of the piston rod 27, and thus also the pivot movement of the tensioning lever 22, which restoring force ensures that both the chain arc 19, and the partial length of the drag chain 4 that extends between the arm-side retaining means 18 and the connection 5 close to the processing location, remain subjected to traction in the direction of the arrow 21, and uncontrolled lashing movements of the drag chain 4 are thus avoided. Air from the free atmosphere flows, via the inlet/outlet value of the cylinder 29, into the lower cylinder chamber of the pneumatic tension spring 28, which chamber enlarges owing to the movement of the piston towards the link 10. The magnitude of the restoring force that is generated by the pneumatic tension spring 28 and acts on the tensioning lever 22 can be varied by changing the system pressure of the compressed air supply of the welding robot 1 prevailing in the upper cylinder chamber of the tension spring 28.

If, following a movement in the clockwise direction of the double arrow VI, the welding head 3 returns, in the counter direction, to the starting position according to FIG. 1, the pneumatic tension spring 28 that is connected to the drag chain 4 by means of the tensioning lever 22 lengthens, assisted by the restoring force previously built up in the upper cylinder chamber of the cylinder 29. In the process, air present in the lower cylinder chamber of the cylinder 29 is forced out into the free atmosphere, through the inlet/outlet valve of the cylinder 29. Owing to the flow resistance acting in the process, the relaxation of the pneumatic tension spring 28 is damped.

What is claimed is:

1. A material processing industrial robot, comprising:
   a manipulator, comprising:
      a base;
      a link mounted on the base so as to be pivotable about a link axis;
      an arm mounted on the link so as to be spaced apart from the link axis and so as to be pivotable about an arm axis that extends in parallel with the link axis; and
      a hand movable at least uniaxially relative to the arm;
   a processing apparatus movable by the manipulator, the processing apparatus attached to the hand of the manipulator and configured to be supplied with a medium by at least one media line; and
   a carrier chain for the media line, the carrier chain comprising:
      a first connection adjacent a processing location on the processing apparatus; and
      a second connection spaced apart from the processing apparatus and adjacent the base;
   wherein the first connection is movable relative to the second connection as a result of movements of at least one of the manipulator or the processing apparatus;
   wherein the carrier chain is retained on the manipulator between the first connection and the second connection, by a plurality of retainers, one retainer of which is a link-side retainer on the link of the manipulator;
   wherein a tensioning lever of a tensioning element is attached to a part of the carrier chain between the link-side retainer and the first connection, and applies a traction to the carrier chain that is oriented away from the first connection;
   wherein the tensioning lever is mounted on the manipulator so as to be pivotable about a lever pivot axis that is parallel with the link axis and the arm axis;
   wherein the part of the carrier chain between the link-side retainer and the first connection moves in a direction counter to the traction in a longitudinal direction of the carrier chain to deflect the tensioning lever towards the first connection, and moves in a direction counter to an action of a restoring force generated by a restoring member of the tensioning element, such that the tensioning lever performs a pivot movement about the lever pivot axis; and
   wherein the link-side retainer forms a chain pivot axis for the part of the carrier chain between the link-side retainer and the first connection, wherein the chain pivot axis formed by the link-side retainer is coaxial with the lever pivot axis of the tensioning lever of the tensioning element.

2. The industrial robot of claim 1, wherein the carrier chain is retained by the link-side retainer so as to be immovable in the longitudinal direction of the carrier chain.

3. The industrial robot of claim 1, wherein the chain pivot axis formed by the link-side retainer is coaxial with the link axis.

4. The industrial robot of claim 1, wherein a magnitude of the restoring force acting on the tensioning lever of the tensioning element is adjustable.

5. The industrial robot of claim 1, wherein a retaining arm that faces the carrier chain is provided on the tensioning lever of the tensioning element, between the lever pivot axis and the carrier chain, wherein the retaining arm comprises a tensioning lever-side retainer by which the carrier chain is retained.

6. The industrial robot of claim 1, wherein the carrier chain forms a radius of curvature of a limited magnitude.

7. The industrial robot of claim 1, wherein the processing apparatus comprises a laser processing apparatus, and the media line comprises an optical fiber cable.

8. The industrial robot of claim 1, wherein an arm-side retainer is provided on the arm of the manipulator, between the link-side retainer and the first connection, and wherein a part of the carrier chain between the link-side retainer and the arm-side retainer is provided as the part of the carrier chain between the link-side retainer and the first connection.

9. The industrial robot of claim 8, wherein the carrier chain is retained by the arm-side retainer so as to be movable in the longitudinal direction of the carrier chain.

10. The industrial robot of claim 1, wherein the restoring member of the tensioning element comprises a tension spring which is arranged between the tensioning lever of the tensioning element and the link of the manipulator, and which can be tensioned by the part of the carrier chain between the link-side retainer and the first connection moving in the direction counter to the traction in the longitudinal direction of the carrier chain and while generating the restoring force that acts on the tensioning lever.

11. The industrial robot of claim 10, wherein the tension spring of the restoring member is designed as a pneumatic tension spring and comprises a piston-cylinder unit that comprises a cylinder and a piston that is displaceable in the cylinder, along a cylinder axis, wherein one element out of the piston and the cylinder is connected to the tensioning lever of the tensioning element, and the other element is connected to the link of the manipulator, wherein a cylinder chamber filled with a gaseous medium is provided inside the cylinder on one side of the piston and wherein it is possible for the gaseous medium in the cylinder chamber to be resiliently compressed, by the part of the carrier chain between the link-side retainer and the first connection moving in the direction counter to the traction in the longitudinal direction of the carrier chain, via the tensioning lever, while generating the restoring force that acts on the tensioning lever.

12. The industrial robot of claim 10, wherein the restoring member comprises a damper for the tension spring of the restoring member.

13. The industrial robot of claim 12, wherein the damper for the tension spring of the restoring member is a pneumatic damper.

14. A material processing industrial robot, comprising:
a manipulator, comprising:
   a base;
   a link mounted on the base so as to be pivotable about a link axis;
   an arm mounted on the link so as to be spaced apart from the link axis and so as to be pivotable about an arm axis that extends in parallel with the link axis; and
   a hand movable at least uniaxially relative to the arm;
a processing apparatus movable by the manipulator, the processing apparatus attached to the hand of the manipulator and configured to be supplied with a medium by at least one media line; and
a carrier chain for the media line, the carrier chain comprising:
   a first connection adjacent a processing location on the processing apparatus; and
   a second connection spaced apart from the processing apparatus and adjacent the base;
wherein the first connection is movable relative to the second connection as a result of movements of at least one of the manipulator or the processing apparatus;
wherein the carrier chain is retained on the manipulator between the first connection and the second connection by a plurality of retainers, one retainer of which is a link-side retainer on the link of the manipulator;

wherein a tensioning lever of a tensioning element is attached to a part of the carrier chain between the link-side retainer and the first connection, and applies a traction to the carrier chain that is oriented away from the first connection;
wherein the tensioning lever is mounted on the manipulator so as to be pivotable about a lever pivot axis that is parallel with the link axis and the arm axis;
wherein the part of the carrier chain between the link-side retainer and the first connection moves in a direction counter to the traction in a longitudinal direction of the carrier chain to deflect the tensioning lever towards the first connection, and moves in a direction counter to an action of a restoring force generated by a restoring member of the tensioning element, such that the tensioning lever performs a pivot movement about the lever pivot axis; and
wherein the link-side retainer forms a chain pivot axis for the part of the carrier chain between the link-side retainer and the first connection, wherein the chain pivot axis formed by the link-side retainer is coaxial with the link axis.

15. A material processing industrial robot, comprising:
a manipulator, comprising:
   a base;
   a link mounted on the base so as to be pivotable about a link axis;
   an arm mounted on the link so as to be spaced apart from the link axis and so as to be pivotable about an arm axis that extends in parallel with the link axis; and
   a hand movable at least uniaxially relative to the arm;
a processing apparatus movable by the manipulator, the processing apparatus attached to the hand of the manipulator and configured to be supplied with a medium by at least one media line; and
a carrier chain for the media line, the carrier chain comprising:
   a first connection adjacent a processing location on the processing apparatus; and
   a second connection spaced apart from the processing apparatus and adjacent the base;
wherein the first connection is movable relative to the second connection as a result of movements of at least one of the manipulator or the processing apparatus;
wherein the carrier chain is retained on the manipulator between the first connection and the second connection by a plurality of retainers, one retainer of which is a link-side retainer on the link of the manipulator;
wherein a tensioning lever of a tensioning element is attached to a part of the carrier chain between the link-side retainer and the first connection, and applies a traction to the carrier chain that is oriented away from the first connection;
wherein the tensioning lever is mounted on the manipulator so as to be pivotable about a lever pivot axis that is parallel with the link axis and the arm axis;
wherein the part of the carrier chain between the link-side retainer and the first connection moves in a direction counter to the traction in a longitudinal direction of the carrier chain to deflect the tensioning lever towards the first connection, and moves in a direction counter to an action of a restoring force generated by a restoring member of the tensioning element, such that the tensioning lever performs a pivot movement about the lever pivot axis; and
wherein the restoring member of the tensioning element comprises a tension spring which is arranged between the tensioning lever of the tensioning element and the link of the manipulator, and which can be tensioned by the part of the carrier chain between the link-side retainer and the first connection moving in the direction counter to the traction in the longitudinal direction of the carrier chain and while generating the restoring force that acts on the tensioning lever.

16. The industrial robot of claim 15, wherein the tension spring of the restoring member is designed as a pneumatic tension spring and comprises a piston-cylinder unit that comprises a cylinder and a piston that is displaceable in the cylinder, along a cylinder axis; wherein one element out of the piston and the cylinder is connected to the tensioning lever of the tensioning element, and the other element is connected to the link of the manipulator; wherein a cylinder chamber filled with a gaseous medium is provided inside the cylinder on one side of the piston; and wherein it is possible for the gaseous medium in the cylinder chamber to be resiliently compressed, by the part of the carrier chain between the link-side retainer and the first connection moving in the direction counter to the traction in the longitudinal direction of the carrier chain, via the tensioning lever, while generating the restoring force that acts on the tensioning lever.

17. The industrial robot of claim 15, wherein the restoring member comprises a damper for the tension spring of the restoring member.

18. The industrial robot of claim 17, wherein the damper for the tension spring of the restoring member is a pneumatic damper.

* * * * *